(12) United States Patent
Lecocq et al.

(10) Patent No.: US 11,742,955 B2
(45) Date of Patent: Aug. 29, 2023

(54) DELIVERING SIGNALS TO CRYOGENIC ENVIRONMENTS VIA PHOTONIC LINKS

(71) Applicant: The Regents of the University of Colorado, a body corporate, Denver, CO (US)

(72) Inventors: Florent Lecocq, Boulder, CO (US); Josue Davila-Rodriguez, Boulder, CO (US); Franklyn John Quinlan, Longmont, CO (US); John Teufel, Erie, CO (US); Scott A. Diddams, Louisville, CO (US); Jose Aumentado, Boulder, CO (US)

(73) Assignees: The Regents of the University of Colorado, a body corporate, Denver, CO (US); Government of the United States of America, as represented by the Secretary of Commerce, Gaithersburg, MD (US)

( * ) Notice: Subject to any disclaimer, the term of this patent is extended or adjusted under 35 U.S.C. 154(b) by 0 days.

(21) Appl. No.: 17/742,252

(22) Filed: May 11, 2022

(65) Prior Publication Data
US 2023/0059433 A1  Feb. 23, 2023

Related U.S. Application Data

(60) Provisional application No. 63/187,227, filed on May 11, 2021.

(51) Int. Cl.
*H04B 10/70* (2013.01)
*H04B 10/2575* (2013.01)

(52) U.S. Cl.
CPC ....... *H04B 10/70* (2013.01); *H04B 10/25759* (2013.01)

(58) Field of Classification Search
None
See application file for complete search history.

(56) References Cited

U.S. PATENT DOCUMENTS

| | | | |
|---|---|---|---|
| 9,260,289 B2 * | 2/2016 | Park | B82Y 20/00 |
| 9,520,180 B1 | 12/2016 | Mukhanov et al. | |
| 10,891,555 B2 | 1/2021 | Ashrafi | |
| 11,195,117 B2 | 12/2021 | Monroe et al. | |
| 11,201,686 B1 * | 12/2021 | Ritter | H04J 14/02 |
| 11,333,557 B2 * | 5/2022 | Uyeno | G01J 5/025 |
| 11,506,951 B2 * | 11/2022 | Ram | G02F 1/2257 |
| 2020/0409438 A1 * | 12/2020 | Tuttle | G06F 1/206 |
| 2021/0409848 A1 * | 12/2021 | Saunders | H04B 10/27 |
| 2022/0156619 A1 * | 5/2022 | Ritter | G06N 10/00 |
| 2022/0397930 A1 * | 12/2022 | Najafi-Yazdi | H10N 69/00 |

* cited by examiner

*Primary Examiner* — Jai M Lee

(57) ABSTRACT

An operational environment is disclosed herein that includes a cryogenic environment and a signal source. The cryogenic environment includes a signal target, an optical link, signal converter devices, and an electrical link. Outside of the cryogenic environment, the signal source generates an electric signal. An electric-to-optical converter converts the electrical signal into an optical signal. The optical link delivers the optical signal into the cryogenic environment. Inside the cryogenic environment, an optical-to-electrical converter converts the optical signal back into an electrical signal. The optical-to-electrical converter transfers the electric signal to the signal target.

20 Claims, 7 Drawing Sheets

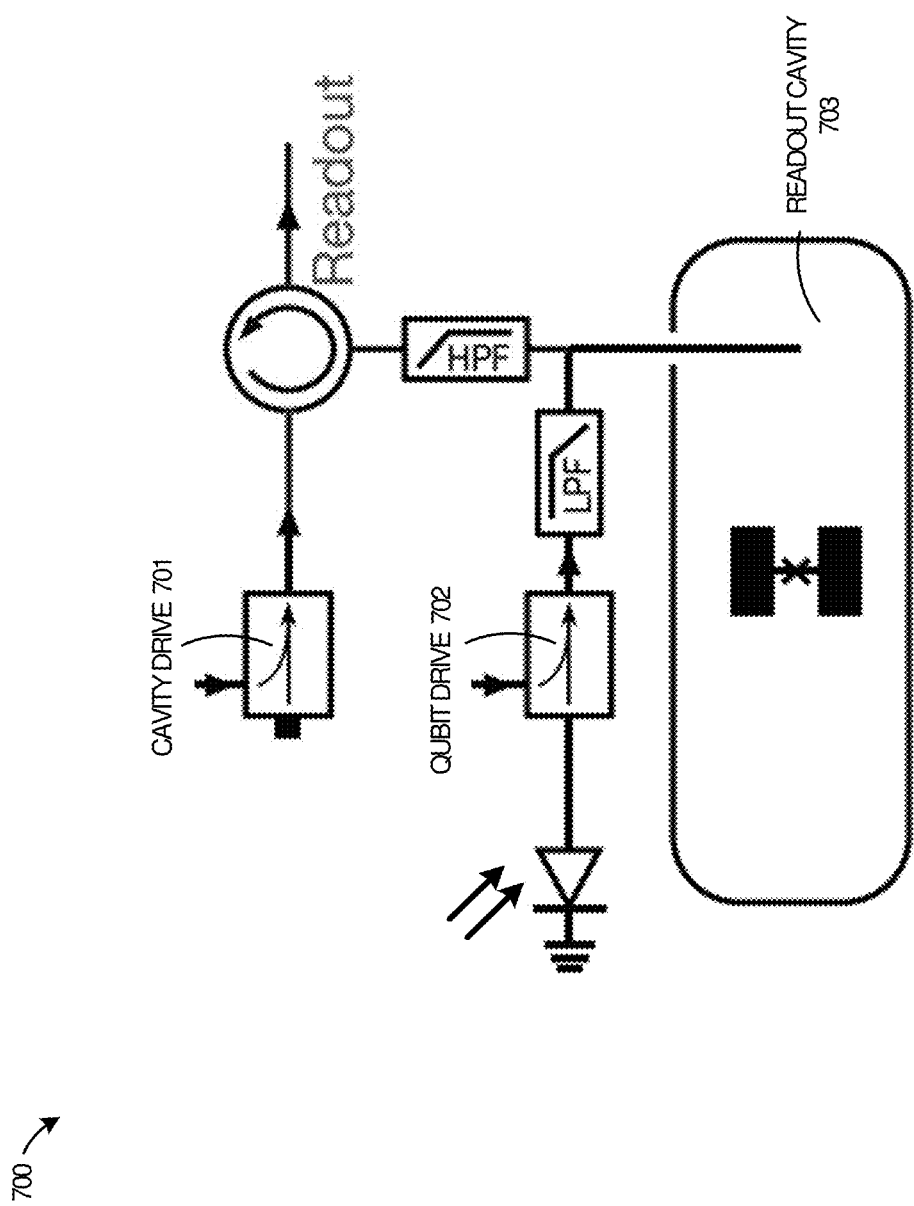

US 11,742,955 B2

DELIVERING SIGNALS TO CRYOGENIC ENVIRONMENTS VIA PHOTONIC LINKS

CROSS-REFERENCE TO RELATED APPLICATIONS

This U.S. Patent Application claims priority to U.S. Provisional Patent Application No. 63/187,227 entitled, "DELIVERING SIGNALS TO CRYOGENIC ENVIRONMENTS VIA PHOTONIC LINKS" which was filed on May 11, 2021, and which is incorporated by reference into this U.S. Patent Application in its entirety.

STATEMENT REGARDING FEDERALLY FUNDED RESEARCH

This invention was made with government support under grant number 70NANB18H006 awarded by NIST. The government has certain rights in the invention.

BACKGROUND

Quantum computing is a computing technology that utilizes the properties of quantum physics to process information. In quantum computing architectures, the elementary building block is referred to as a quantum bit (or qubit), in analogy with a "bit" of information in classical computers (0 or 1). Superconducting circuits are a leading technology for enabling quantum computing. Superconducting circuits use microwaves to interact with and read information from the qubits. Since the microwave frequencies used are on the order of 10 Gigahertz (GHz), the superconducting circuits must be operated at cryogenic temperatures below 100 millikelvin (mK). Dilution refrigerators can operate below 20 mK and are used to create the cryogenic temperatures. In traditional quantum computing systems, the qubits are controlled and measured with microwave pulses that are generated at room temperature and then delivered into the cryogenic environment via coaxial lines. The use of coaxial lines creates space limitations and results in considerable heat loads as the number of qubits scales. This heat load caused by the coaxial lines competes against the limited cooling power of the dilution refrigerators. This limits the maximum number of qubits in the quantum computer and therefore limits its computer power.

OVERVIEW

Technology is disclosed herein that improves the ability for signals to be delivered into cryogenic environments in such a manner as to improve the scalability and performance of such systems. In some examples, a method for delivering electric signals into a cryogenic environment comprising an optical link is disclosed. The method begins by generating an optical signal external to the cryogenic environment. The optical signal may be encoded with one or more microwave pulses. The method continues by routing the optical signal into the cryogenic environment. The method continues by converting, in the cryogenic environment, the optical signal to an electrical signal. When the optical signal is encoded with microwave pulses, the microwave pulses may be reconstituted into the electrical signal during conversion. The method continues by routing the electric signal to a target.

In some examples, the method may further comprise sending the electric signal to drive control or readout circuitry of a superconducting qubit. This may be accomplished by routing the electric signal converted in the cryogenic environment to a target in a readout cavity in the cryogenic environment and producing a readout signal. The readout signal may then be routed out of the cryogenic environment.

In some examples, a signal delivery system comprising a photonic link is disclosed. The signal delivery system comprises a signal source, an Electric-to-Optical (E/O) signal converter, an optical link, and an Optical-to-Electrical (O/E) signal converter. The signal source generates an electrical signal outside of the cryogenic environment. The E/O signal converter is positioned external to the cryogenic environment and converts the electrical signal to an optical signal. The optical link carries the optical signal generated by the E/O signal converter into the cryogenic environment. The O/E signal converter is positioned within the cryogenic environment and converts the optical signal delivered by the optical link back into an electric signal. The O/E signal converter may then deliver the electrical signal that it generated to a signal target within the cryogenic environment.

The signal target may comprise a readout cavity in which a superconducting qubit resides. The signal target may comprise one or more superconducting quantum bits and their associated control and readout circuitry. The electrical signal delivered to the signal target may control the state of the quantum bits as well as drive the readout circuitry to measure the state of the quantum bits. The O/E signal converter may comprise a photodetector, photodiode or another type of electro-optical device. The photodiode may utilize the photoelectric effect. Alternatively, or in addition to, the O/E signal converter may comprise an electro-optical device relying on the piezoelectric effect, the Pockel effect, or some other type of nonlinear optical property.

The signal delivery system may further comprise a drive link that carries a drive signal into the cryogenic environment to stimulate the signal target. For example, the drive link may carry a drive signal that causes a state transition of a superconducting qubit coupled to a readout cavity resulting in a shift in resonance of the readout cavity. The signal delivery system may additionally comprise readout circuitry that carries a readout signal characterizing the signal target out of the cryogenic environment. For example, the interaction between the electric signal converted in the cryogenic environment and the signal target may cause a shift in amplitude and phase of the electric signal. The readout circuitry may transfer a readout signal that indicates the shift in amplitude and phase of the electric signal.

The photonic link(s) proposed herein may also be useful in other applications requiring the delivery of electrical signal to a cryogenic environment like radio astronomy (detector arrays and electronics), quantum electronic devices (spin qubit, parametric amplifiers, Josephson Arbitrary Microwave Generators and Voltage standards), or even classical computing applications.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 7 illustrates another operational environment in an implementation.

DETAILED DESCRIPTION

Figure 1:
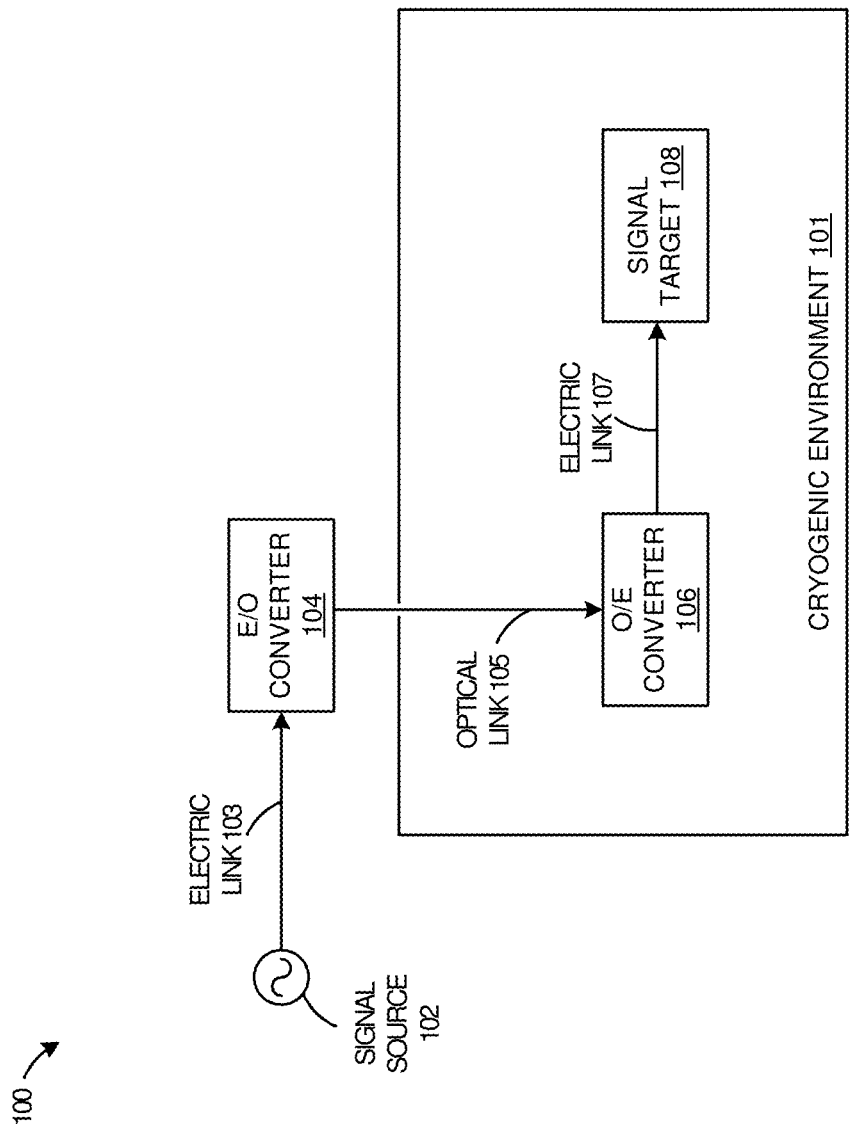
FIG. 1 illustrates an operational environment in an implementation.

A number of leading quantum information architectures, such as superconducting circuits and quantum dots, rely on carefully shaped microwave pulses delivered to a cryogenic environment to control and readout the quantum state of each qubit. Presently, these pulses are generated at room temperature and then routed through heavily filtered and attenuated coaxial transmission lines to the qubits held at temperatures below 100 mK. As these systems continue to scale, the heat load, cost, and complexity of a large number of coaxial microwave signal lines become a significant limitation on the achievable size and complexity. Photonic links offer a potential scaling solution, due to their large intrinsic bandwidth, low noise, and the low thermal conductivity of optical fiber. However, it must first be established that qubit interaction via a photonic link can be realized without corrupting the qubit's fragile quantum state. Here we demonstrate readout of a superconducting qubit using microwave signals transmitted over optical fiber and photodetected in the 20 mK environment of a superconducting qubit. When compared to operation with microwave pulses delivered via standard coaxial cabling, no degradation of the qubit coherence time is observed, and a single-shot readout fidelity of 98% is maintained. By reducing the heat load in quantum computing systems through the use of photonic links, large-scale quantum information systems with superconducting qubits become viable.

For a superconducting qubit in the dispersive regime, there are two ways classical microwave signals directly interact with the qubit for quantum information processing. First is the qubit drive, where gate operations are performed with a microwave signal that is resonant with the qubit transition frequency. Second is the qubit state readout, where a microwave signal measures the resonance shift of a high-Q cavity that is coupled to the qubit. In both cases, the required microwave powers are small, typically well below a nanowatt (nW). For readout, coupling between the cavity and qubit results in a shift in the cavity resonance depending on the state (ground or excited) of the qubit. As such, phase and amplitude shifts of a weak probe field with frequency near the cavity resonance "read out" the qubit state. The qubit is extremely sensitive to excess noise carried along the drive and readout lines, where a single stray microwave photon can decohere the qubit state. Since the strongest noise coupling is at the cavity resonance frequency, high-fidelity cavity readout is the focus of some embodiments disclosed herein.

Delivering on the revolutionary promise of a universal quantum computer will require processors with millions of quantum bits. In superconducting quantum processors, each qubit is individually addressed with microwave signal lines that connect room-temperature electronics to the cryogenic environment of the quantum circuit. The complexity and heat load associated with the multiple coaxial lines per qubit limits the maximum possible size of a processor to a few thousand qubits. In some embodiments, a photonic link is disclosed that uses an optical fiber to guide modulated laser light from room temperature to a cryogenic photodetector, capable of delivering shot-noise-limited microwave signals directly at millikelvin temperatures. The photonic link may enable high fidelity control and readout of a superconducting qubit and can meet the stringent requirements of superconducting quantum information processing. Leveraging the low thermal conductivity and large intrinsic bandwidth of optical fiber enables the efficient and massively multiplexed delivery of coherent microwave control pulses, providing a path towards a million-qubit universal quantum computer.

Superconducting circuits have emerged as a leading technology for quantum computing, thanks to steady progress in gate and measurement fidelity combined with the capability of lithographically producing large and complex qubit networks. However, the demonstration of a complete architecture that can truly scale to millions of qubits remains an elusive milestone. Indeed, such quantum processors must operate in a cryogenic environment to be superconducting and, more importantly, initialized close to their quantum ground state. As these processors operate at microwave frequencies on the order of 10 Gigahertz (GHz), they require a temperature well below 100 millikelvin (mK) to eliminate thermally activated transitions. This is achieved in commercial dilution refrigerators, whose base temperatures routinely reach below 20 mK. In current architectures, the superconducting qubits are controlled and measured with microwave pulses generated at room temperature and delivered via heavily attenuated coaxial lines. Besides simple space limitations, this approach results in considerable heat loads as the number of qubits scales, both passive, due to the thermal conductivity of the coaxial lines, and also active, due to the signal power dissipated in the attenuators. This heat load competes against the limited cooling power of the cryostat, typically ~20 microwatts ($\mu W$). Therefore, with current technologies one could imagine systems with a few thousand qubits at best, far from the predicted numbers required for compelling applications of quantum computers.

These crucial challenges outlined in the preceding paragraphs have motivated new approaches that seek to increase the possible size of superconducting quantum processors. The development of quantum coherent interconnects, which are capable of sharing fragile quantum states between processors in separate cryostats remains a long-standing challenge. Concurrently, innovations in classical interconnects aim to reduce the heat load associated with interfacing with the quantum processor, taking the form of high-density wiring or cryogenic electronics. Indeed, even with successful quantum coherent interconnects, a scalable technology capable of delivering classical signals suitable for high-fidelity qubit operation could be instrumental in building a large-scale quantum computer. Now referring to the Figures.

FIG. 1 illustrates operational environment 100 in an implementation. Operational environment 100 comprises cryogenic environment 101, signal source 102, electric link 103, electric-to-optical (E/O) converter 104, optical link 105, optical-to-electrical (O/E) converter 106, electric link 107, and signal target 108.

Signal source 102 represents one or more devices capable of producing an electric signal. Electric links 103 and 107 represent any link suitable for carrying one or more electric signals, examples of which include coaxial cables and metallic wiring. Electric link 103 carries the resulting electric signal generated by signal source 102 to converter 104. Converters 104 and 106 represent any device capable of converting an optical signal to an electrical signal and vis-versa. For example, O/E converter 106 may comprise a photodetector. Converter 103 transforms the electric signal generated by signal source 102 into and optical signal which is carried into cryogenic environment 101 via optical link 105. Optical link 105 represents any link suitable for carrying one or more optical signals, example of which include, optical fibers, or free space optical links. Converter 106 receives the optical signal from converter 104 via optical link 105 and converts the optical signal back into an electric signal within cryogenic environment 101. Converter 106 transfers the resulting electrical signal to signal target 108 over electric link 107. Signal target 103 is representative of any device or sub-system such as a Three-Dimensional (3D) readout cavity, qubit drive line or an image sensor, photocell(s), or the like. The interaction between the electric signal and signal target 108 generates a readout signal. In some examples, environment 100 implements process 200 illustrated in FIG. 2.

Figure 2:
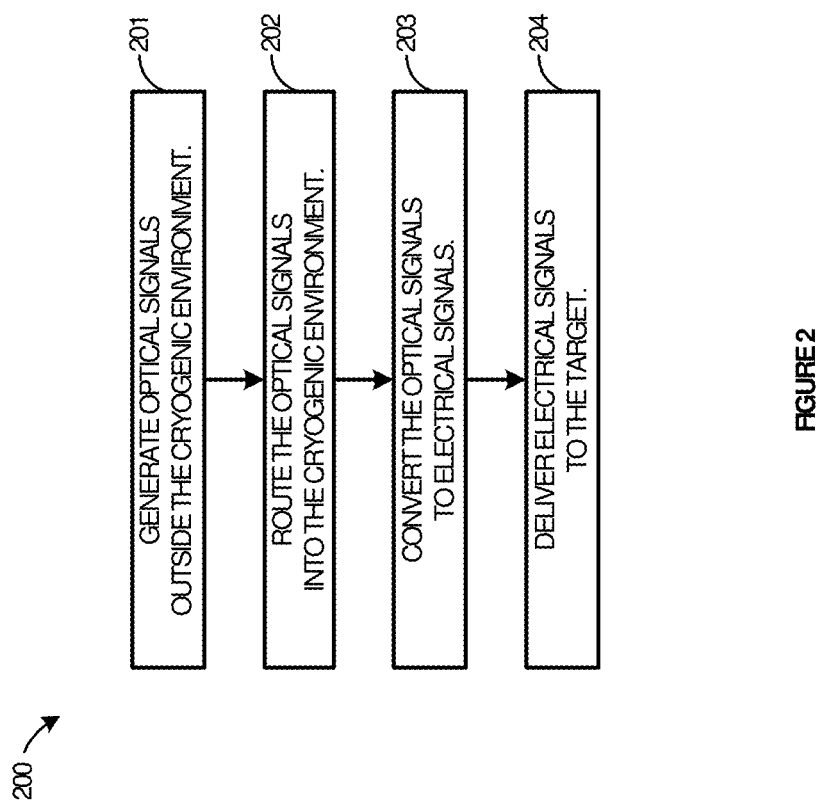
FIG. 2 illustrates a method in an implementation.

FIG. 2 illustrates process 200 in an implementation. Process 200 begins with a signal generating device generating optical signals outside of the cryogenic environment (step 201). Each optical signal may have one or more microwave signals modulated onto it. The signal generating device routes the optical signals into the cryogenic environment to one or more optical-to-electrical signal converters (step 202). The converters convert the optical signals to an electrical signal (step 203). The converters deliver the resulting electrical signals to the target(s) over electrical links (step 204).

Referring back to FIG. 1, environment 100 includes a brief example of process 200 as employed by the various components that comprise environment 100. In operation, signal source 102 generates an electric signal and transfers the electric signal to E/O converter 104 over electric link 103. E/O converter 104 converts the electric signal into an optical signal with one or more microwave signals modulated into it (step 201). E/O converter 104 routes the optical signal to O/E converter 106 in cryogenic environment 101 over optical link 105 (step 202). For example, converter 104 may transfer the optical signal over a free space optical link to converter 106. O/E converter 106 transforms the optical signal received from E/O converter 104 into an electrical signal for delivery to signal target 108 (step 203). O/E converter 106 transfers the electric signal to signal target 108 over electric link 107 (step 204). For example, signal target 108 may comprise a readout cavity with a qubit. Converter 106 may transfer the electric signal to control the qubit and generate a readout signal.

Figure 3:
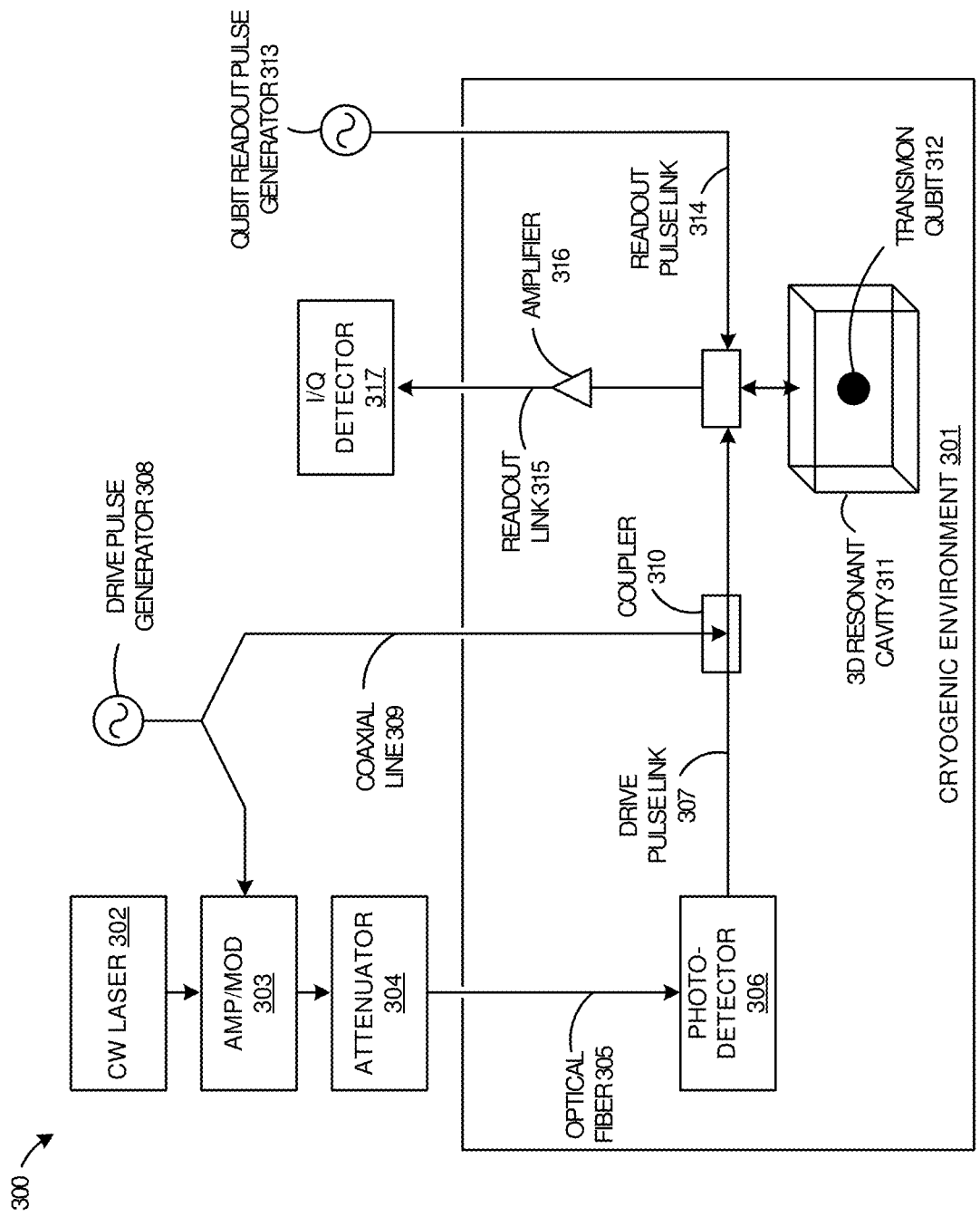
FIG. 3 illustrates another operational environment in an implementation.

FIG. 3 illustrates operational environment 300 in another implementation. Operational environment 300 comprises cryogenic environment 301, Continuous Wave (CW) laser 302, amplifier and modulator (AMP/MOD) 303, attenuator 304, drive pulse generator 308, I/Q detector 317, and qubit readout pulse generator 313. Cryogenic environment 301 is representative of a cryogenically cooled region (~20° mK). For example, cryogenic environment 401 may comprise a dilution refrigerator that can cool to 20° mK. Cryogenic environment 301 comprises optical fiber 305, photodetector 306, drive pulse link 307, coaxial line 309, coupler 310, 3D resonant cavity 311, readout link 314, readout link 315, and amplifier 316. 3D resonant cavity comprises transmon qubit 413.

In operation, Continuous Wave (CW) laser 302 outputs a laser. The output is intensity modulated by amplification and modulation device 303. Device 303 may modulate the laser with a pulsed microwave generated by drive pulse generator 306 to control the state of transmon qubit 312. The depth of modulation of the optical power may be near 100%. For example, drive pulse generator 408 may transfer a pulsed microwave with a carrier frequency near 5 GHz to amplification/modulation device 403 to drive transmon qubit 312 to transition from a ground state to an excited state. The output of the modulator 303 is attenuated by attenuator 304, then transmitted to photodetector 306 over optical fiber 305. Photodetector 306 comprises a high-speed photodetector that reconstitutes the microwave pulses generated by laser 302. Photodetector 306 transfers the reconstituted drive microwave pulses to transmon qubit 312 coupled to readout cavity 311. The drive microwave pulses drive the state transition of transmon qubit 313.

Qubit readout pulse generator 313 transfers pulses over readout pulse link 314 to readout the state of transmon qubit 313. The coaxial drive and readout lines are routed through a series of cold attenuators to bring the room temperature microwave signals to the coherent state of the microwave field. Upon reflection from cavity 311, the microwave pulses are amplified by amplifier 316 and routed to room temperature via readout link 315. I/Q detector 317 receives the readouts and resolves shifts in the readout cavity resonance frequency. For example, the required microwave power generated by photodetector 306 may comprise approximately −110 dBm with a corresponding average photocurrent of 20 nA. Readout pulses may be directed either to the photonic link or a standard coaxial line that was used to establish the baseline readout performance. The photonic link implemented by environment 300 has a comparative simplicity advantage since signal attenuation was performed in a single step at room temperature.

Figure 4:
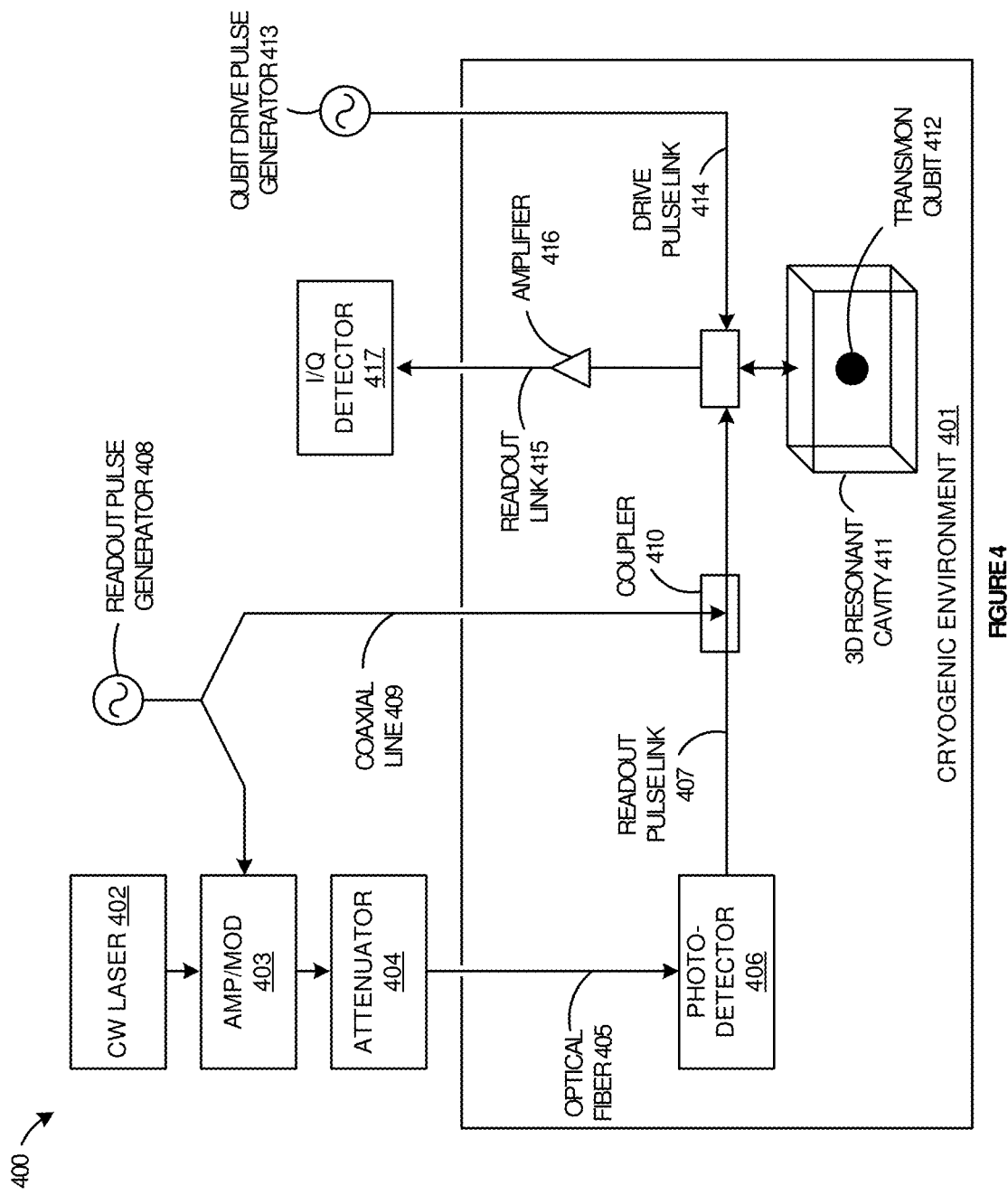
FIG. 4 illustrates another operational environment in an implementation.

FIG. 4 illustrates operational environment 400 in an implementation. Environment 400 comprises cryogenic environment 401, Continuous Wave (CW) laser 402, amplifier and modulator (AMP/MOD) 403, attenuator 404, readout pulse generator 408, I/Q detector 417, and qubit driver pulse generator 413. Cryogenic environment 401 is representative of a cryogenically cooled region (~20° mK) and comprises optical fiber 405, photodetector 406, readout pulse link 407, coaxial line 409, coupler 410, 3D resonant cavity 411, drive pulse link 414, readout link 415, and amplifier 416. 3D resonant cavity comprises transmon qubit 412.

In operation, Continuous Wave (CW) laser 402 outputs a laser. The output is intensity modulated by amplification and modulation device 403. For example, device 403 may modulate the laser with a pulsed microwave whose carrier frequency matched that of the readout cavity near 11 GHz. The depth of modulation of the optical power may be near 100%. The output of the modulator 403 is attenuated by attenuator 404, then transmitted to photodetector 406 over optical fiber 405. Photodetector 406 comprises a high-speed photodetector that reconstitutes the microwave pulses encoded onto the output of laser 402. Photodetector 406 transfers the reconstituted microwave pulses to transmon qubit 412 coupled to readout cavity 411. Upon reflection from cavity 412, the microwave pulses are amplified by amplifier 416 and routed to room temperature via readout link 415. I/Q detector 417 receives the readouts and resolves shifts in the readout cavity resonance frequency. Readout pulses may be directed either to the photonic link or a standard coaxial line that was used to establish the baseline readout performance. Qubit drive pulse generator 413 transfers pulses over drive link 415 to drive the qubit transition of transmon qubit 413. The coaxial drive and readout lines are routed through a series of cold attenuators to bring the room temperature microwave signals to the coherent state of the microwave field. The photonic link implemented by environment 400 has a comparative simplicity advantage since signal attenuation was performed in a single step at room temperature.

Ramsey interferometry may be performed to measure the qubit decoherence through the T2 relaxation time. A pair of p/2 pulses each ~40 ns in duration is delivered through the coaxial drive line with a microwave carrier slightly detuned from the qubit transition frequency. The time delay between p/2 pulses may be varied, with a ~500 ns duration readout pulse occurring just after the second p/2 pulse. Repeated measurements of the qubit state (ground or excited) may be taken for each delay, such that the probability of finding the qubit in the excited state could be determined. Coherence of the qubit over the duration between p/2 pulses results in an oscillation in the excited state probability as a function of delay. However, as the qubit decoheres, ground and excited state become equally likely, and the fringe contrast disappears. Ramsey oscillations may be measured with readout pulses delivered via the photonic link. In some examples, the Ramsey oscillations between those generated via the photonic link and standard coaxial line are virtually indistinguishable. Thus, despite the potential of the photonic link to add detrimental excess noise, the coherence of the qubit is preserved.

In this example, the qubit is prepared in either the excited state or the ground state, and the state is then measured with a single readout pulse. Fidelity of the readout is reduced when the readout state does not correspond to the prepared state. A fidelity of 98% may be achieved with both the photonic link. Again, these results indicate any excess noise in the photonic link is below the level that would corrupt readout fidelity. A cryogenic photonic link can deliver readout pulses to a superconducting qubit without reducing the qubit coherence or readout fidelity, thus meeting the stringent requirements of quantum information processing systems based on superconducting qubits. Measurements on qubit drive demonstrate both control and readout pulse delivery with photonic links.

Figure 5:
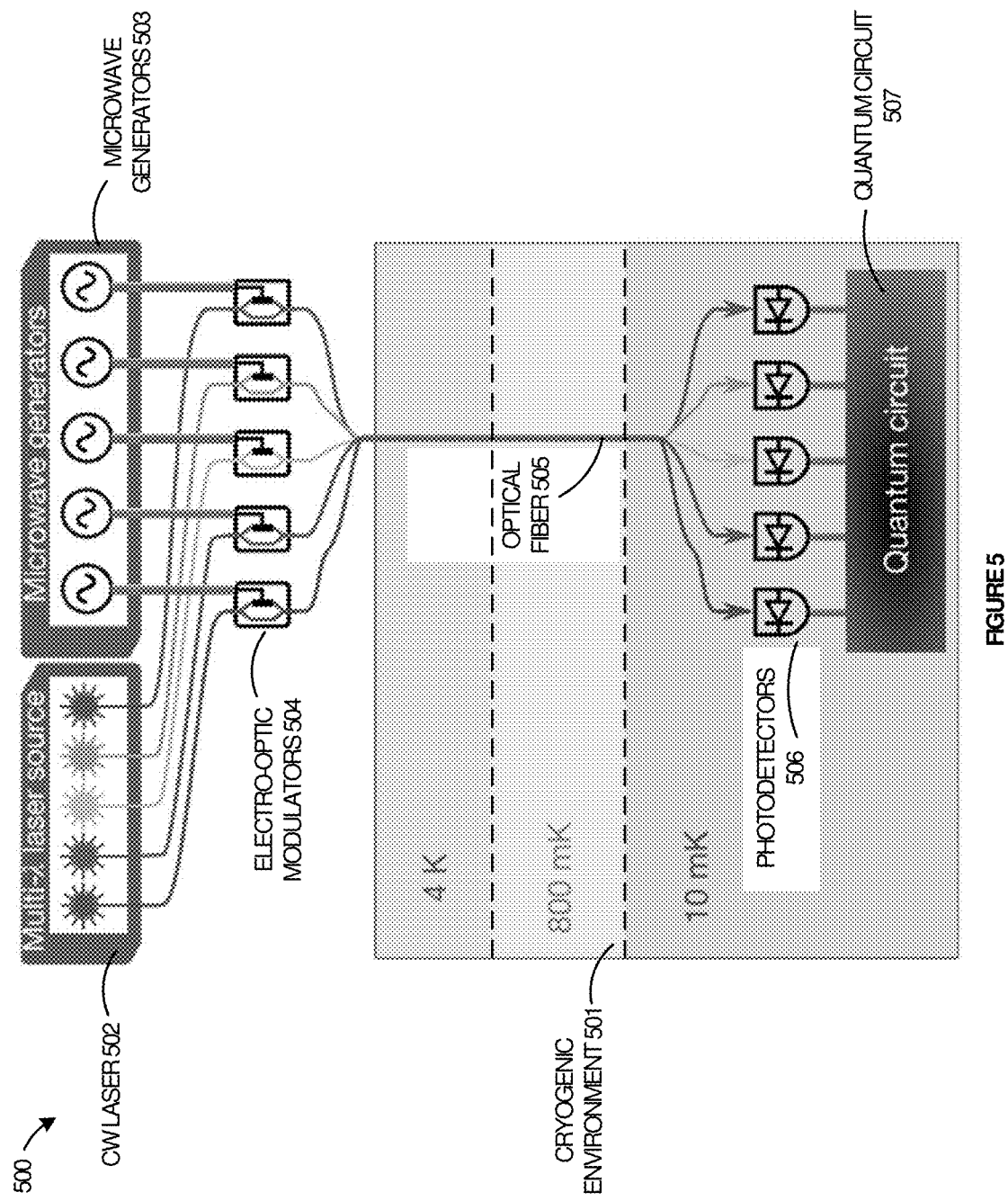
FIG. 5 illustrates another operational environment in an implementation.

FIG. 5 illustrates environment 500. Environment 500 comprises cryogenic environment 501, CW laser 502, microwave generators 503, and electro-optic modulators 504. Cryogenic environment 501 comprises optical fiber 505, photodetectors 506, and quantum circuit 507. Cryogenic environment 501 comprises a 4° K temperature region, an 800° mK temperature region, and a 100° mK temperature region. Photodetectors 506 and quantum circuitry 507 are positioned in the 100° mK temperature region of cryogenic environment 501. Optical fiber 505 links the region outside of cryogenic environment 501 to the 10 mK region.

Environment 500 utilizes ubiquitous telecommunication technologies and standard radio frequency-photonics components, designed for room-temperature operation (300 k), to demonstrate an ultra-cryogenic photonic link. In this temperature regime, the photonic link exhibits noise levels approaching microwave vacuum fluctuations, enabling the control and measurement of highly coherent quantum states. The microwave control signals are upconverted to the optical frequency domain using Electro-Optic Modulators (EOMs) 504, guided along optical fibers 505 to cryogenic environment 501 of the processor and down-converted back to microwave frequencies using high-speed photodetection 506. The vanishing thermal conductivity of optical fibers at low temperature and their large intrinsic bandwidth enables the delivery of millions of control signals directly to the millikelvin stage with no substantial passive heat load. To evaluate this photonic link, a high-speed photodiode at 20 mK controls and measures a superconducting transmon qubit residing in quantum circuit 507. Environment 500 enables the ability to perform high-fidelity single-shot qubit readout and fast qubit gates while maintaining quantum coherence. Environment 500 exploits the extreme noise sensitivity of the qubit to measure the photodiode noise at sub-microampere photocurrents, revealing shot-noise-limited performance.

The optical generation of microwave control signals relies on the photoelectric effect in a photodiode. An incident optical photon generates an electron-hole pair in a semiconductor, with a quantum efficiency $\eta$. The carriers are then swept away to the electrodes of the diode owing to a built-in or applied voltage, creating a current pulse. Summing over many incident photons yields the photocurrent, $I=RP_0$, where $R=\eta e/\hbar\omega_0$ is the responsivity, e is the electron charge, $P_0$ is the incident optical power, $\omega_0$ is the frequency of the optical photons, and $\hbar$ is the reduced Planck constant. Full-depth modulation of the optical power at a microwave ($\mu$) frequency $\omega_\mu$ that is well within the bandwidth of the photodiode results in an oscillating photocurrent at that same frequency, with an output microwave power $$P_\mu = \frac{1}{2}Z\bar{I}^2$$

where $\bar{I}=\langle I \rangle$ is the average photocurrent and Z is the impedance of the load.

The transmon qubit used in quantum circuitry 507 comprises a single Josephson junction shunted by a capacitor, forming an oscillator that is nonlinear at the single-photon level. Full control over its quantum state $|\Psi\rangle = \alpha|g\rangle + \beta|e\rangle$, where $|g\rangle$ and $|e\rangle$ are, respectively, the ground and first excited states, is achieved through coherent drives at the transition frequency $\omega_q$. The qubit is dispersively coupled to a linear microwave cavity of linewidth $\kappa$ such that the cavity resonance frequency depends on the qubit state, $\omega_{g,e}=\omega_c\pm\chi$ with $\omega_c$ the mean cavity resonance frequency and $\chi$ the dispersive shift. A drive at the mean cavity frequency is therefore reflected with a qubit-state-dependent phase shift $\pm 2\tan^{-1}2\chi/\kappa$, which is detected by a microwave homodyne set-up.

Figure 6:
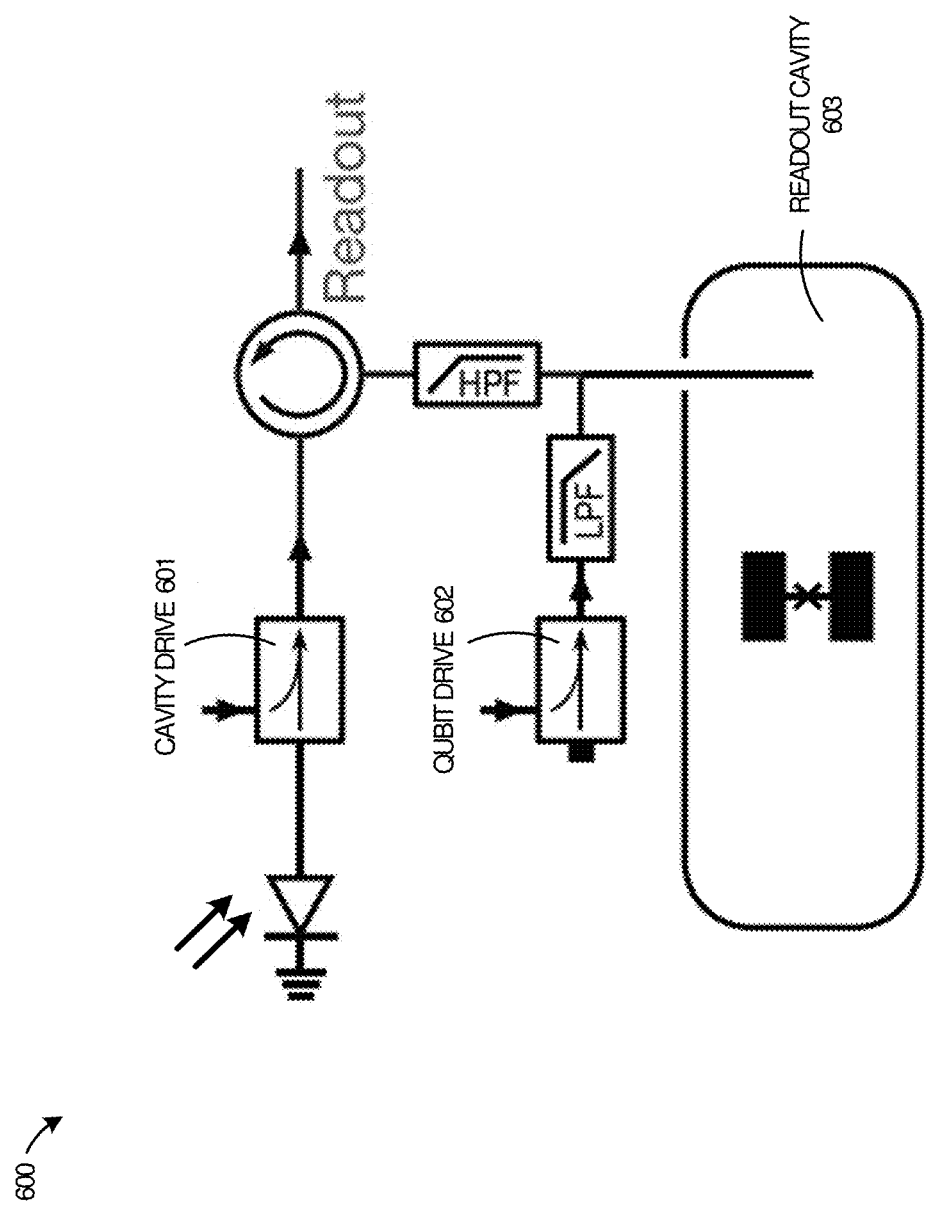
FIG. 6 illustrates another operational environment in an implementation.

FIGS. 6 and 7 comprise environments 600 and 700 and demonstrate two embodiments of the present technology. Environment 600 illustrates the use of a photonic link to generate microwave pulses that readout a transmon qubit embedded in a three-dimensional microwave cavity. Environment 700 illustrates the use of a photonic link to generate microwave pulses that control a transmon qubit embedded in a three-dimensional microwave cavity. In both environment 600 and 700, a single antenna is used to address both the qubit and the cavity. Drives at $$\frac{\omega_q}{2\pi} \cong 5.1 \text{ GHz and } \frac{\omega_q}{2\pi} \cong 10.9 \text{ GHz}$$

are physically separated by a microwave diplexer. The average qubit relaxation time is $T_1 \cong 43$ μs and the cavity linewidth is $$\frac{\kappa}{2\pi} \cong 3 \text{ MHz}.$$

The photonic link comprises a diode laser operating at a wavelength of 1,490 nm and a commercial EOM at room temperature, connected via an optical fiber to an Indium-Gallium-Arsenic (InGaAs) photodiode at 20° mK. For comparison, microwave signals can be routed to the quantum circuit with full vector control either through the photonic link or through a regular coaxial line.

Referring to FIG. 6, environment 600 comprises cavity drive 601, qubit drive 602, and readout cavity 603. Signals generated by photodiode cavity drive 601 drive microwave readout cavity 603. The laser power is suppressed during the qubit state manipulation, and then turned on and modulated at the cavity frequency $\omega_c$ to perform the readout. The cavity is driven into a coherent state of approximately 15 photons, using an average photocurrent I=20 nA during the measurement pulse. The resulting homodyne signal can be measured with the qubit initialized in the ground or excited state to generate a Gaussian distribution resulting in two well separated Gaussian distributions corresponding to the ground and excited state of the qubit. A single-shot measurement fidelity of 98% may be obtained and is identical to the fidelity obtained using a traditional coaxial line. To determine the effect that readout with a photonic link may have on qubit coherence, the qubit coherence may be compared when measured using the photodiode or the coaxial line. The ensemble average of two representative sets of measurements may be modeled as a function of the delay between two π/2 pulses, yielding Ramsey oscillations. Additionally, there is no indication that the qubit relaxation rate is degraded by stray optical light.

Referring to FIG. 7, environment 700 comprises cavity drive 701, qubit drive 702, and readout cavity 703. Signals generated by photodiode qubit drive 702 drive the qubit resident in readout cavity 703. The laser power is modulated at the qubit frequency $\omega_q$ to control the qubit state, followed by a readout pulse at the cavity frequency using a coaxial line. When driven on resonance, the qubit undergoes Rabi oscillations between its ground and excited states at a frequency $\Omega_R$. The oscillations may be modeled as a function of the amplitude of the drive at the cavity, using either the photodiode or a regular coaxial line. For Rabi frequencies much less than the transmon's anharmonicity, the transmon is well approximated by a two-level system, and the Rabi frequency increases linearly with the drive amplitude. At higher drive power, the Rabi frequency deviates from the linear scaling, as expected from multilevel dynamics. The precise matching of the Rabi rates of the photonic link to the coaxial line drive may be achieved without any signal predistortion to compensate for nonlinearities of the photonic link. High qubit gate fidelity is expected as the Rabi rate exceeds the decay rate of the oscillations by more than three orders of magnitude.

Excess photocurrent noise could potentially limit qubit gate or readout fidelity. Predicting the effect of photocurrent noise requires its precise measurement in a temperature and photocurrent regime previously unexplored for high-speed photodiodes. In some examples, the qubit-cavity systems illustrated in the preceding figures may act as a quantum spectrum analyzer to measure the noise performance of the photodiode with excellent sensitivity. In the absence of technical noise, the photocurrent noise is fundamentally limited by shot noise, with a power spectral density given by $S_I=2e\bar{I}$. This shot noise spectrum is white until the frequency cut-off of the photodiode, nominally 20 GHz. In each case the microwave diplexer ensures that the noise drives only either the cavity or the qubit into a thermal state. Photocurrent noise leads to an average cavity occupancy. Owing to the dispersive coupling, this results in a Stark shift of the qubit frequency as well as qubit dephasing, which can be resolved by measuring Ramsey oscillations in the presence of a constant laser intensity. As expected with shot noise, the cavity occupancy increases linearly with photocurrent with an experimental background of about 1%. Photocurrent noise may lead to depopulation of the qubit ground state. The population of the excited states as a function of the photocurrent may comprise a linear behavior, again in good agreement with shot noise, and a background qubit occupancy of about 10%. The preceding photodiode systems do not show any major deviation from shot noise that could indicate, for example, excess optical intensity noise, excess thermal noise due to local heating within the photodiode, or excess noise from the voltage noise at the microwave input of the EOM. At the photocurrents used for the qubit readout or control. As such the optical shot noise has negligible impact on measurement and gate fidelity.

The approaches described in the preceding figures can scale to a large number of qubits. The number of qubits in a processor is limited by the heat load of the classical interconnects on the mixing chamber of the dilution refrigerator. It is estimated that the passive heat load of a typical optical fiber is around 3 pW, allowing a typical dilution refrigerator with a cooling power of 20 μW at 20 mK to be wired with millions of optical fibers. In addition, each optical fiber has the bandwidth to easily support hundreds of qubits. With negligible passive heat load, the active heat load due to the dissipation of optical power during qubit gates becomes the limitation. The maximum number of qubits that can be supported by photonic links is therefore inversely proportional to the duty cycle at which each qubit is driven. The total heat load of a photonic link can be compared to the cooling power, yielding a maximum number of physical qubits as a function of duty cycle. Each qubit is addressed by its own optical fiber and photodiode, and use typical values for Rabi rate, pulse shaping and coupling rate to the drive line. In comparison with the photonic link approach, the total heat load for a regular coaxial approach is dominated by the passive heat load. In some examples, the total heat load using a photonic link can be reduced compared to the coaxial approach when operating at duty cycle of the order of 1%. Although the duty cycle of a gate sequence must be maximized to avoid the deleterious effects of decoherence, the rate at which the sequence is repeated can be reduced without sacrificing fidelity. This could be advantageous for noisy intermediate-scale quantum computations, where operating at a smaller overall duty cycle would allow for an increase in the number of qubits that can be addressed using photonic links.

Fault-tolerant quantum computation with a million qubits will need to run continuously at the highest duty cycle allowed by the quantum and classical hardware, possibly for hours or days. Building such a quantum processor will require both an improvement in cooling power and a reduction of the heat load. The coaxial approach would require a reduction of its passive heat load by orders of magnitude, and microwave multiplexing, thinner coaxial cables, or superconducting ribbon cables. On the other hand, the photonic link approach presented herein benefits from any reduction of its active heat load. As an example, the large source impedance of a photodiode can be exploited such that an increase in system impedance decreases the amount of photocurrent required to deliver a given amount of microwave power. This in turn reduces the required optical power to drive each qubit, leading to an increase in the maximum number of physical qubits. Additionally, multiplexing schemes—such as encoding multiple microwave signals onto a single optical carrier or the use of short optical pulses—may likewise provide a path to reduce the required optical power even further. The ultra-cryogenic photonic link presented herein comprises scalable platforms for addressing superconducting qubits. By incorporating high-speed photodetection with a superconducting qubit at millikelvin temperatures, the photonic link is fully compatible with quantum coherent qubit operation. The qubits may be used to measure the noise of the photonic link and show that the current noise is fundamentally set by the shot noise of the light, even at extremely low photocurrents. These embodiments highlight the benefits of mature opto-electronic technology for quantum applications and will only be enhanced by further optimization of hardware and protocols specifically tailored for cryogenic operation. Combined with photonic methods for transmitting the qubit state information to room temperature on optical fiber, a fully photonic interface with a superconducting quantum processor is possible. This promising technology provides a path towards scaling superconducting quantum processors to an unprecedented number of quantum bits, enabling many of the longstanding promises of the quantum revolution.

The following paragraphs provide an overview of various mathematical, operational, and scientific methods that can be used to operate the photodiode devices described in the preceding figures. Specifically, the mathematical, operational, and scientific methods relate to the basic theory for a transmon/cavity system and introduce the notation and assumptions used.

A transmon is an anharmonic oscillator of frequency $\omega_q$ and anharmonicity $\alpha$. The transmon can be treated as a two-level system, forming the qubit. It is coupled to a resonant cavity of frequency $\omega_q$ via the Jaynes-Cummings Hamiltonian represented by equation (1).

$$\mathcal{H}_{qed} = \frac{1}{2}\hbar\omega_q\hat{\sigma}_z + \hbar\omega_c\hat{a}^\dagger\hat{a} + \hbar g(\hat{a}\hat{\sigma}_+ + \hat{a}^\dagger\hat{\sigma}_-) \qquad (1)$$

In Equation (1), g is the strength of the exchange interaction. When operating in the dispersive regime, the detuning between the qubit and cavity frequencies is large compared to the coupling strength, $|\Delta|=|\omega_c-\omega_q|\gg g$, preventing any direct energy exchange between the two systems. In this regime, the Hamiltonian may be represented as equation (2).

$$\mathcal{H}_{qed} \cong \frac{1}{2}\hbar\omega_q\hat{\sigma}_z + \hbar\omega_c\hat{a}^\dagger\hat{a} - \chi\hat{\sigma}_z\hat{a}^\dagger\hat{a} \qquad (2)$$

In Equation (2), $$\chi = \frac{g^2}{\Delta}\frac{\alpha}{\Delta+\alpha}$$

is the so-called dispersive shift. The cavity resonance frequency depends on the qubit state: $\omega_c+\chi$ or $\omega_c-\chi$ for the qubit respectively in the ground state $|g\rangle$ or excited state $|e\rangle$. Conversely the qubit frequency is shifted by $2\chi$ per photon in the cavity and the qubit frequency can be redefined as $\omega_q=\omega_q+\chi$ to absorb the Lamb shift. Importantly, the dispersive approximation is only valid for small photon numbers in the cavity, and spurious qubit transitions occur when approaching the critical photon number $n_{crit}=\Delta^2/4g^2$.

The cavity and the qubit are coupled to the environment using a single antenna. The cavity linewidth $\kappa$ is dominated by the coupling to the antenna. Due to the filtering of the cavity, the qubit is only weakly coupled to the antenna, at a rate $\Gamma_{ext}$, much smaller than the intrinsic relaxation rate $\Gamma_{int}$ of the qubit.

The qubit is readout by driving the cavity with an input microwave field of amplitude $\alpha_{in}$ and frequency $\omega_d$. In the steady state, the resulting coherent state, $\alpha_{g,e}$, depends on the qubit state $|g\rangle$ or $|e\rangle$, following the Equation (3):

$$\left(\omega_d - \omega_c \pm \chi + \frac{i\kappa}{2}\right)\alpha_{g,e} = i\sqrt{\kappa}\alpha_{in} \qquad (3)$$

The output field, $\alpha_{out}=\sqrt{\kappa}\alpha_{g,e}-\alpha_{in}$, acquires a qubit state dependent phase shift $$\pm 2\tan^{-1}\left(\frac{2\chi}{\kappa}\right)$$

that enables qubit state discrimination. One can show that the measurement rate is $\Gamma_m=\kappa|\alpha_e-\alpha_g|^2$ and is maximized by the distance in phase space between the two coherent states. The qubit measurement fidelity is defined as $F=1-P(e|q)-P(g|e)$ where $P(x|y)$ is the probability of measuring the qubit state x when prepared in the state y. In absence of preparation errors and qubit transitions during the measurement, and in the steady state, the measurement fidelity after an integration time $\tau$ can be written as $F=\text{erf}(\sqrt{\eta\tau\Gamma_m/2})$, where $\eta$ is the microwave measurement efficiency.

Photon number fluctuations and qubit dephasing fluctuations of the number of photons in the cavity induce fluctuations of the qubit frequency and therefore dephasing. The Stark-shift and dephasing rate for an average thermal occupancy of the cavity $\bar{n}$ are shown respectively by Equation (4).

$$\Delta^{th}_{Stark} = \beta 2\chi\bar{n}, \text{ and } \Gamma^{th}_\phi = \beta\frac{4\chi^2}{\kappa}\bar{n} \qquad (4)$$

In Equation (4), $\beta=\kappa^2/(\kappa^2+4\chi^2)$. Note that these expressions are only valid for $\bar{n}\ll1$. The Stark-shift can be extracted from the frequency of Ramsey oscillations. The qubit dephasing is extracted from the exponential decay of the Ramsey oscillations, $$\Gamma_2 = \frac{\Gamma_1}{2} + \Gamma_\phi,$$

and is dominated by photon number fluctuations, $\Gamma_\phi=\Gamma_\phi^{th}$.

Under resonant drive, the qubit undergoes Rabi oscillations between the ground and excited states at the Rabi rate $\Omega_R=2\sqrt{\dot{n}\Gamma_{ext}}$ where $\dot{n}$ is the number of photons per second at antenna. When the Rabi rate approaches the transmon anharmonicity, $\Omega_R \sim \alpha$, the transmon dynamics involve higher excited states, leaving the computational subspace. A hallmark of this regime is the deviation from the linear relation between Rabi rate and drive amplitude. In practice, typical superconducting quantum processors operate in the linear regime, $\Omega_R < \alpha/2$.

The photodiode can be seen as a high impedance current source, with an output current I proportional to the incident optical power $P_0$ such that $I = \mathcal{R} P_0$, where $\mathcal{R} = \eta e/\hbar\omega_0$ is the responsivity, e is the electron charge, $\omega_0$ is the frequency of the optical photons and $\eta$ is the quantum efficiency (defined as the probability of generating an electron-hole pair per incident photon). A perfectly efficient photodiode ($\eta=1$) operating at a wavelength of 1490 nm ($\omega_0/2\pi \cong 201$ THz) has a maximum responsivity $\mathcal{R} \cong 1.2$ AW$^{-1}$. In practice, the quantum efficiency depends on extrinsic effects such as alignment and Fresnel reflections, and on the intrinsic efficiency of the detector. Many photodiodes comprise a responsivity of 0.7 AW$^{-1}$ at room temperature. At 20 mK the responsivity drops to 0.5 AW$^{-1}$, caused by a change of the optical alignment due to thermal contractions.

Microwaves are generated by modulating the optical power such that $P_0(t)=\overline{P_0}(1+m\cos(\omega t+\phi))$ where $\overline{P_0}$ is the average optical power, m is the modulation depth (m≤1), $\omega$ is the modulation frequency, and $\phi$ is the modulation phase. This induces an oscillating photocurrent $I(t)=h(t)*\mathcal{R} P_0(t)$ where h(t) is the impulse response of the photodiode. The corresponding microwave power $P_\mu$ in a load impedance Z is $$P_\mu = \frac{1}{2}m^2\bar{I}^2 \times |H(\omega)|^2 \times Z$$

where $\bar{I}=\mathcal{R}\overline{P_0}$ is the average photocurrent and $H(\omega)$ is the transfer function of the photodiode. For the photodiodes described herein, the response function is limited by the RC time constant, with a 3 dB cutoff frequency set by the capacitance of the diode and the impedance of the load.

The probabilistic nature of creating electron-hole pairs results in photocurrent shot noise with power spectral density $S_I(\omega)=2e\bar{I}|H(\omega)|^2$. While the photocurrent noise measurements are consistent with shot noise-limited photodetection for photocurrents up to 20 µA, the possible contributions of two other known sources of excess photocurrent noise are estimated: voltage noise at the microwave input of the electro-optic intensity modulator and excess laser intensity noise.

For voltage noise at the EOM input, a lossless EOM with an infinite extinction ratio can be considered. The output optical power is $P_0(t)=\overline{P_0}(1+\sin(\pi V(t)/V_\pi))$ where $\overline{P_0}$ is the average optical power, $V_\pi$ is the voltage required to go from maximum transmission to minimum transmission and $V(t)=V_\mu(t)+V_{dc}$ is the input voltage. For a modulator biased at quadrature ($V_{dc}=0$) and in the limit of small input voltage ($V_\mu(t)<<V_\pi$) the output power becomes $P_0(t)=\overline{P_0}(1+\pi V_\mu(t)/V_\pi)$. The noise variance of the optical power is then $\langle \delta P_0^2 \rangle = \overline{P_0}^2 \pi^2 \langle \delta V_0^2 \rangle / V_\pi^2$. The photocurrent noise variance is then $\langle \delta I_0^2 \rangle = \mathcal{R} \langle \delta P_0^2 \rangle = \bar{I}^2\pi^2 \langle \delta V_0^2 \rangle / V_\pi^2$ where $\bar{I}=\mathcal{R}\overline{P_0}$ is the average photocurrent. In terms of the current noise power spectral density, this becomes $S_I^{\delta V}(\omega)=S_V(\omega)\bar{I}^2\pi^2/V_\pi^2$ where $S_V(\omega)=4k_BT_NZ_{EOM}$ is the input voltage noise power spectral density set by the noise temperature $T_N$ of the input impedance of the EOM $Z_{EOM}$.

Laser intensity noise is usually given as a fractional variation, termed Relative Intensity Noise (RIN), defined as RIN($\omega$)=$S_P(\omega)/P_0^2$ where $S_P(\omega)$ is the power spectral density of the optical power fluctuations, in units of W$^2$ Hz$^{-1}$. The linear relationship between optical power and photocurrent leads to a photocurrent noise due to RIN given by $S_I^{RIN}(\omega)=\bar{I}^2$RIN($\omega$).

The total current noise emitted by the photodiode is then $S^I(\omega)=2e\bar{I}+S_I^{\delta V}(\omega)+S_I^{RIN}(\omega)$. For a photocurrent of, $\bar{I}=20$ µA, the photocurrent shot noise is $2e\bar{I} \cong 8\times10^{-24}$ A$^2$ Hz$^{-1}$. In the embodiments presented herein, $S_I^{\delta V} \cong 3\times10^{-25}$ A$^2$ Hz$^{-1}$, more than an order of magnitude smaller than the photocurrent shot-noise. The RIN of readily available commercial semiconductor distributed feedback (DFB) lasers is below $10^{-14}$ Hz$^{-1}$, and can approach $10^{-16}$ Hz$^{-1}$, leading to a current noise $S_I^{RIN}$, $5\times10^{-24}$ A$^2$ Hz$^{-1}$. Since deviations from photocurrent shot-noise are not resolved, it can be concluded that the laser RIN is below $10^{-15}$ Hz$^{-1}$.

It should be appreciated that the measurement is sensitive only to noise above microwave vacuum fluctuations and that any residual thermal noise is already included in the qubit Stark-shift or qubit population at zero photocurrent.

Here a procedure is disclosed to move the reference plane from the cavity antenna to the photodiode. As the hardware and frequencies differ slightly between the qubit control and readout experiments, they require separate in-situ calibrations.

The microwave power at the cavity antenna can be calibrated by using the coaxial line. The Rabi rate can be compared to extract the coupling rate between the qubit and cavity antenna. The loss can be defined between the photodiode and the cavity antenna, A, so that the power at the cavity antenna is $$AP_\mu = A\frac{1}{2}Z\bar{I}^2,$$

where A includes the effect of explicit loss and the response function of the photodiode. The current noise spectral density can be extracted for the photocurrent, $S_I$, using the qubit ground state population $P_g$. From detailed balance it can be found that $(\Gamma_{int}+\Gamma_{ext})n=\Gamma_{int}n_{int}+\Gamma_{ext}n_{ext}$ where $n=(1-P_g)/P_g$, $n_{int}$ is the average photon number in the internal bath extracted from the equilibrium population at zero photocurrent, and $n_{ext}=AZS_I/\hbar\omega_q$. This in turn yields Equation (5).

$$S_I = \frac{\hbar\omega_q}{AZ\Gamma_{ext}}[(\Gamma_{int}+\Gamma_{ext})n - \Gamma_{int}n_{int}] \quad (5)$$

The photocurrent can be fixed, and the Stark shift used to calibrate the intra-cavity photon number and therefore extract the power at the cavity antenna $$AP_\mu = A\frac{1}{2}Z\bar{I}^2.$$

As the measurement cavity is over-coupled, the current noise spectral density of the photocurrent can be extracted from the cavity occupancy, $S_I=n\hbar\omega_c/AZ$.

Microwave noise may be induced by the photocurrent shot noise of the photodiode. In the context of qubit readout, extraneous noise at the cavity frequency (1) de-phases the qubits coupled to it and (2) reduces the microwave measurement efficiency, which in turn impacts the qubit measurement fidelity. In the context of qubit control, extraneous noise at the qubit frequency induces transitions to the excited states which reduces gate fidelity. To simplify the discussion, a photodiode with unity quantum efficiency and operating well within its bandwidth is used, and loss between the photodiode and the cavity or the qubit control line is neglected.

For qubit readout, optimal measurement speed and separation in phase space between $\alpha_g$ and $\alpha_e$ is obtained for $2\chi=\kappa$ and $\omega_d=\omega_c$, leasing to $|\alpha_g|^2=|\alpha_e|^2=|\alpha|=2n/\kappa$. The corresponding average photocurrent is $\bar{I}=\sqrt{\kappa\theta}|\alpha|$. In turn the microwave noise is $\bar{n}=2e\sqrt{\kappa/\theta}|\alpha|$, which induces qubit dephasing according to Equation (4) and limits the efficiency of the measurement chain to $\eta=1/(1+2\bar{n})$. For a typical operating conditions, the microwave measurement efficiency limited to $\eta\approx94\%$, much larger than the traditional systems. Additionally, qubit measurement infidelity is typically dominated by qubit relaxation events during the measurement with only a small contribution due to the limited measurement efficiency. Therefore, the assignment errors due to the photocurrent shot noise can be expected to be negligible.

For qubit control, it can be assumed a qubit gate error rate dominated by the relaxation rate, $\Gamma\downarrow$, and the excitation rate, $\Gamma\uparrow$, which are linked by detailed balance $\Gamma\downarrow=\bar{n}\Gamma\uparrow$. The error probability for a gate of length $\tau$ is given by Equation (6).

$$\epsilon=1-\exp[-(\Gamma\uparrow+\Gamma\downarrow)\tau]=1-\exp[-(1+\bar{n})\Gamma\downarrow\tau] \quad (6)$$

For a $\pi$-pulse at a Rabi rate $\Omega_R \gg (1+\bar{n})\Gamma\downarrow$, the error probability is given by Equation (7).

$$\epsilon = \frac{\pi\Gamma\downarrow}{\Omega_R} \quad (7)$$

The qubit relaxation rate can be decomposed into an external contribution from the coupling to the control line, $\Gamma_{ext}$, and an internal contribution from all other degrees of freedom, $\Gamma_{int}$. The Rabi rate is defined as $\Omega_R=2\sqrt{\dot{n}\Gamma_{ext}}$ where $\dot{n}$ is the photon flux in photon/s at the control line. The effective qubit population, $\bar{n}$, is linked to the population of the internal and external bath, $\bar{n}_{int}$ and $\bar{n}_{ext}$, by detailed balance so that $\Gamma\downarrow\bar{n}=\Gamma_{int}\bar{n}_{int}+\Gamma_{ext}\bar{n}_{ext}$. In the following it can be assumed the internal bath is cold, $\bar{n}_{int}=0$.

For a photodiode operating well within its bandwidth driving a control line of impedance Z, the photon flux is set by the microwave power generated by the photodiode $$\hbar\omega_q \dot{n} = \frac{1}{2}Z\bar{I}^2$$

and the external bath occupancy is set by the photon shot-noise $\hbar\omega_q\bar{n}_{ext}=2e\bar{I}Z$, leading to equation (8).

$$\epsilon = \frac{\pi}{\sqrt{2}}\left(\frac{\Gamma\downarrow}{\bar{I}}\sqrt{\frac{\theta}{\Gamma_{ext}}} + 2e\sqrt{\frac{\Gamma_{ext}}{\theta}}\right) \quad (8)$$

At low photocurrent, $$\bar{I} \ll \frac{\hbar\omega_q\Gamma\downarrow}{2eZ\Gamma_{ext}},$$

the microwave noise generated by the photodiode is negligible, $\bar{n}\ll1$. In this regime the error probability decreases as the ratio between Rabi rate and relaxation rate increases. In contrast, at high photocurrent, $$\bar{I} \gg \frac{\hbar\omega_q\Gamma\downarrow}{2eZ\Gamma_{ext}},$$

the error probability plateaus as the errors induced by the photocurrent shot noise balances the increase in Rabi rate. For a realistic cases, the error probability saturates at $\epsilon > 4 \times 10^{-5}$, far below what has been achieved in traditional technologies. Note that as qubit coherence improves, the coupling rate to the control line will decrease, which reduces the minimum error probability.

It should be appreciated that that the spectrum of microwave noise induced by the photocurrent shot noise on the photodiode is white up to the bandwidth of the photodiode. When considering an architecture where multiple qubits are addressed using a single photodiode, one would have to consider that all these qubits are driven by the microwave noise of the photodiode.

Here calculations and assumptions used to estimate and compare the heat load of the regular coaxial approach and the photonic link approach are detailed. For simplicity, the focus is on the heat load associated with the qubit microwave control lines, and all other heat loads are neglected, such as those associated with qubit readout and dc-flux biasing. For both approaches, the heat can be divided into a passive and active heat load. The passive heat load is set by the heat flow through the coaxial cables or optical fibers. The active heat load comes from the Joule heating in the attenuators in the coaxial approach and from the dissipated optical power in the photonic link approach.

The heat load from a 0.085 diameter stainless steel coaxial cable has been measured to be 14 nW, slightly larger than the estimated value of 4 nW. Following the same reasoning, the heat load of an optical fiber is estimated to be 3 pW. The optical fiber comprises a silica core and cladding of 125 µm diameter with a coating increasing the diameter to 250 µm. The microwave power required at the qubit control line, $P(t)=\hbar\omega_q\dot{n}(t)$, depends on the Rabi rate and coupling rate so that $P(t)=\hbar\omega_q\Omega_R(t)^2/4\Gamma_{ext}$ where $\Omega_R(t)=\Omega_R S(t)$ and $S(t)$ is the time domain pulse shape. The average power of a pulse of duration $\tau$ is defined as $\bar{P}=\int_0^\tau P(t)/\tau=\hbar\omega_q\Omega_R^2\bar{S}^2/4\Gamma_{ext}$ with $\bar{S}=\int_0^\tau S(t)/\tau$. In the coaxial approach, attenuation at the mixing chamber is necessary to reduce the black body radiation from higher temperature stages. This leads to an active heat load per control pulse $P_{link}^{act}=\bar{P}\times(1/A-1)$ where $A<1$ is the attenuation. In the photonic link approach, the optical power is fully dissipated as heat, leading to an active heat load per control pulse $P_{link}^{act}=\sqrt{2\bar{P}/Z}\mathcal{R}^2$, neglecting loss between the photodiode and the control line. The total heat load strongly depends on the duty cycle per qubit D, $P_{coax,link}=P_{coax,link}^{pass}+D\times P_{coax,link}^{act}$. The total number of qubits that can be addressed in both approaches is $N_{coax,link}=P_{cool}/P_{coax,link}$ where $P_{cool}$ is the cooling power at the mixing chamber.

While some examples provided herein are described in the context of quantum computing systems utilizing a photodiode, it should be understood that the condition systems and methods described herein are not limited to such embodiments and may apply to a variety of other extension implementation environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment, or an embodiment combining software and hardware aspects that may all generally be referred to herein as a "circuit," "module" or "system."

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method for delivering electric signals into a cryogenic environment comprising an optical link, the method comprising:
   generating an optical signal external to the cryogenic environment;
   routing the optical signal into the cryogenic environment;
   in the cryogenic environment, converting the optical signal to an electrical signal; and
   routing the electric signal to a target in the cryogenic environment wherein the target comprises a superconducting qubit within a readout cavity and wherein a shift in resonance of the readout cavity causes a shift in amplitude and phase of the electrical signal.

2. The method of claim 1 further comprising sending the electric signal to control circuitry of the superconducting qubit.

3. The method of claim 1 further comprising sending the electric signal to readout circuitry of the superconducting qubit.

4. The method of claim 3 further comprising:
   producing a readout signal; and
   routing the readout signal out of the cryogenic environment.

5. The method of claim 1 wherein generating the optical signal comprises encoding one or more microwave pulses onto the optical signal.

6. The method of claim 5 wherein converting the optical signal to the electrical signal comprises reconstituting the one or more microwave pulses into the electrical signal.

7. The method of 1 wherein the optical link comprises at least one of a guided optics link or a free space optics link.

8. The method of claim 1 wherein routing the optical signal into the cryogenic environment comprises routing the optical signal to a photodetector in the cryogenic environment.

9. The method of claim 8 wherein converting the optical signal to the electrical signal in the cryogenic environment comprises the photodetector converting the optical signal to the electrical signal.

10. The method of claim 8 wherein routing the optical signal into the cryogenic environment comprises simultaneously routing multiple optical signals over the optical link to multiple photodetectors in the cryogenic environment.

11. A cryogenic signal delivery system comprising:
a signal source external to the cryogenic environment, wherein the signal source generates an electrical signal;
an Electric-to-Optical (E/O) converter external to the cryogenic environment, wherein the E/O converter converts the electrical signal to an optical signal;
an optical link that carries the optical signal into the cryogenic environment; and
an Optical-to-Electric (O/E) converter in the cryogenic environment, wherein the O/E converter converts the optical signal to another electrical signal and delivers the other electrical signal to a target in the cryogenic environment wherein the target comprises a superconducting qubit within a readout cavity and wherein a shift in resonance of the readout cavity causes a shift in amplitude and phase of the other electrical signal.

12. The cryogenic signal delivery system of claim 11 wherein the optical link comprises a guided optics link.

13. The cryogenic signal delivery system of claim 11 wherein the optical link comprises a free space optics link.

14. The cryogenic signal delivery system of claim 11 wherein the O/E converter comprises an electro-optical device configured to convert the optical signal to the other electrical signal using one or more of a photoelectric effect, a piezoelectric effect, a Pockel effect, or another non-linear optical property.

15. The cryogenic signal delivery system of claim 11 wherein the E/O converter comprises a laser configured to generate the optical signal.

16. The cryogenic signal delivery system of claim 15 further comprising a modulator external to the cryogenic environment, wherein the modulator encodes one or more microwave pulses onto the optical signal.

17. The cryogenic signal delivery system of claim 16 wherein the O/E converter reconstitutes the one or more microwave pulses into the other electrical signal.

18. The cryogenic signal delivery system of claim 11 further comprising:
a dilution refrigerator; and wherein:
the cryogenic environment comprises a volume within the dilution refrigerator comprising a temperature less than or equal to 20° millikelvin (mK).

19. The cryogenic signal delivery system of claim 11 further comprising a drive link that carries a drive signal into the cryogenic environment, wherein the drive signal stimulates a state transition of the superconducting qubit within the readout cavity to cause the shift in resonance of the readout cavity.

20. The cryogenic signal delivery system of claim 19 further comprising readout circuitry that carries a readout signal out of the cryogenic environment, wherein the readout signal has an amplitude and phase indicative of the shift in the amplitude and the phase of the other electrical signal.

* * * * *